United States Patent Office 2,967,870
Patented Jan. 10, 1961

2,967,870

DERIVATIVES OF DINAPHTHO-FURAN-DIONE

David I. Randall, New Vernon, and Wilhelm Schmidt-Nickels, Little York, N.J., assignors to General Aniline & Film Corporation, New York, N.Y., a corporation of Delaware No Drawing. Filed Nov. 17, 1958, Ser. No. 774,169

18 Claims. (Cl. 260—346.2)

This invention relates to novel heterocyclic dyestuff intermediates having the formula

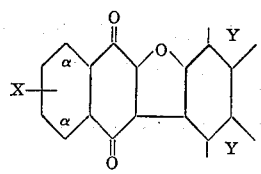

wherein one adjacent pair of Y valences are bonded to hydrogen atoms, the other adjacent pair of Y valences are bonded to a group having the formula

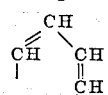

and X is selected from the group consisting of $NO_2$ and $NH_2$ and is bonded in one of the $\alpha$-positions.

The provision of the above described intermediates, and methods for their production constitute the objects and purposes of the instant invention.

The compounds of the instant invention may be prepared by reacting 1 mole of 8-nitro-2,3-dichloro-1,4-naphthoquinone with 1 mole of an $\alpha$- or $\beta$-monohydroxynaphthalene such as 1-naphthol and 2-naphthol in the presence of an alkaline acid binding agent. It will be noted that the naphthol reactant must have one of the positions ortho to each of the OH groups unsubstituted. Compounds of the instant invention in which X is $NH_2$ may be obtained by subjecting the nitro product of the above reaction to alkaline reduction in known manner, as for example by treatment with alkaline sodium hydrosulfide or sodium hydrosulfite. The resulting amino compound is obtained in its leuco form which may be converted to the keto form in the usual manner by oxidation, as for example by treatment with air or the like. It will of course be understood that substituents inert to the desired reaction and to the desired use of the instant compounds may be present in the dyestuff intermediates of the instant invention.

The preferred alkaline acid binding agent for use in the process of the instant invention is pyridine, although other similar organic tertiary amine bases may be employed such as tripropylamine, dimethylcyclohexylamine, N-methyl morpholine, the lower alkylated pyridines, and the like. The alkaline acid binding agent preferably acts simultaneously as a diluent for the reaction, which is carried out at elevated temperatures, conveniently at the boil.

In the above reaction, the hydroxy group of the naphthol compound reacts with one of the chlorine atoms in the naphthoquinone compound to split off hydrogen chloride and the other chlorine atom in the naphthoquinone compound reacts with the free hydrogen atom ortho to the said hydroxy group to split off another hydrogen chloride group. Since the directive influence of the nitro group in the naphthoquinone compound is not absolute, the reaction inherently produces a mixture of two isomeric compounds due to competition between the two chlorine atoms in the naphthoquinone for reaction with the hydroxy group or unsubstituted position adjacent thereto in the naphthol. Accordingly, in one of such isomeric compounds, X in the above formula is bonded in the upper $\alpha$ position, in "cis" position relative to the heterocyclic oxygen atom, and in the other of such isomeric compounds X is bonded in the lower $\alpha$ position in "trans" position relative to the heterocyclic oxygen atom. Accordingly, when one mole of 8-nitro-2,3-dichloro-1,4-naphthoquinone is reacted with one mole of 1-naphthol as in Example 1 below, a mixture of two isomers is produced in which the isomer containing the nitro group in the "cis" position relative to the heterocyclic oxygen atom may be referred to as 11-nitro-dinaphtho[1,2-2',3']furan-7,12-dione, and the other isomer in which the nitro group is in "trans" position relative to the heterocyclic oxygen atom may be referred to as 8-nitro-dinaphtho[1,2-2',3']furan-7,12-dione.

Similarly, when 2-naphthol is employed as the naphthol reactant instead of 1-naphthol, as in Example 2 below, a mixture of isomeric compounds is produced in which the isomer containing the nitro group in "cis" position relative to the heterocyclic oxygen atom may be referred to as 9-nitro-dinaphtho[2,1-2',3']furan-8,13-dione, and the other isomer containing the nitro group in "trans" position relative to the heterocyclic oxygen atom may be referred to as 12-nitro-dinaphtho[2,1-2',3']furan-8,13-dione.

If desired, the isomers in the mixtures produced by the above described reactions may be separated from each other by various means commonly employed by workers skilled in the art. Illustratively, one or more of the following known methods of separation may be employed:

(1) Fractional precipitation: According to this method, the mixture of isomers may be dissolved in concentrated sulfuric acid and ice added to lower the acidity. The mixture is then filtered on a glass sinter funnel and the cake introduced into water to obtain one of the isomers. The filtrate is poured into ice and water to obtain the other isomer. This method may be employed to separate the nitro-containing isomers as well as the amino-containing isomers.

(2) Fractional crystallization: Here, the mixture of isomers is dissolved in a hot organic solvent such as dichlorobenzene or the like and the solution allowed to cool until the first isomer crystallizes out. This isomer is filtered off and the filtrate further cooled or evaporated to obtain the second isomer.

(3) Vacuum sublimation (fractional).

(4) Fractional crystallization of the acetylamino derivatives followed by hydrolysis of the separated compounds to regenerate the free amino groups.

(5) Chromatographic adsorption: The corresponding amino compounds may be produced by reduction of the above mentioned isomeric compounds, and reduction of the mixtures of isomers produced by the above described reactions will yield mixtures of the corresponding amino-containing isomers.

The compounds of the instant invention, particularly those compounds wherein X is $NH_2$, or the isomeric mixtures of such compounds, may serve as intermediates in the production of novel vat dyestuffs, for example by reaction with an acylating agent such as benzoyl chloride, terephthaloyl chloride and the like as disclosed and claimed in our copending application Serial No. 556,414, now U.S. Patent No. 2,870,168, with halo substituted vattable polycyclic ketones such as dibenzopyrenequinone, anthanthrone, pyranthrone, violanthrone, and the like, as disclosed and claimed in our copending application Serial No. 556,415, now U.S. Patent No. 2,862,-931, or with halo derivatives of anthraquinones having one position ortho to each halo substituent unsubstituted, followed by carbazole ring-closure as disclosed and claimed in our copending application Serial No. 556,473, now United States Patent No. 2,813,875, all filed on December 30, 1955.

The following examples in which parts are by weight unless otherwise indicated, are illustrative of the instant invention and are not to be regarded as limitative. Unless otherwise indicated, parts by weight are in grams, and parts by volume are in cc.

*Example 1*

A charge of 90 parts by volume pyridine, 5.8 parts by weight 1-hydroxynaphthalene and 10.9 parts by weight 8-nitro-2,3-dichloro-1,4-naphthoquinone (prepared according to U.S. Patent 1,681,599) was stirred at reflux for 6 hours. The reaction product was filtered off at room temperature, washed with pyridine, acetone and dried. It was a mixture of 2 isomeric compounds of the formula

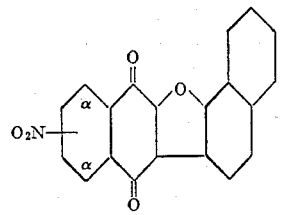

in one of which the —NO$_2$ is bonded in one α position and in the other of which the —NO$_2$ is bonded in the other α position.

Reduction:

A charge of 1500 parts by weight of 2% aqueous sodium hydroxide solution and 6 parts by weight of the above nitro compounds was heated to 70° C. at which temperature 24 parts by weight sodium hydrosulfite was added. Stirring was continued at 70° C. for ½ hour. Then air was blown through the solution while allowing it to cool to room temperature. The mixture of corresponding precipitated amino compounds of the formula

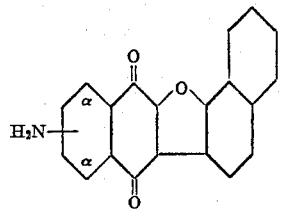

was filtered off, washed neutral and dried.

*Example 2*

A charge of 90 parts by volume pyridine, 5.8 parts by weight 2-hydroxynaphthalene and 10.9 parts by weight 8-nitro-2,3-dichloro-1,4-naphthoquinone was reacted as described in Example 1. The resulting mixture of 2 isomeric compounds of the formula

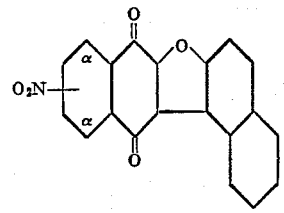

in one of which the —NO$_2$ is bonded in one α position and in the other of which the —NO$_2$ is bonded in the other α position, was reduced to a mixture of the corresponding amino compounds of the formula

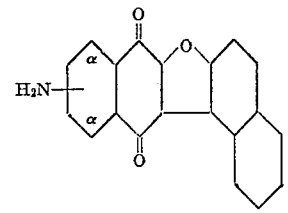

and filtered off, washed neutral and dried as described in Example 1.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

This application is a continuation-in-part of our copending application Serial No. 556,395, filed December 30, 1955, now abandoned.

We claim:

1. Compounds having the formula

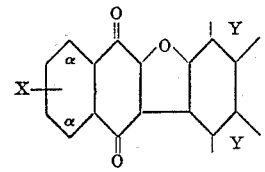

wherein one adjacent pair of Y valences are bonded to hydrogen atoms, the other adjacent pair of Y valences are bonded to a group having the formula

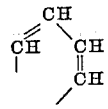

and X is selected from the group consisting of NO$_2$ and NH$_2$ and is bonded in one of the α positions.

2. A compound having the formula

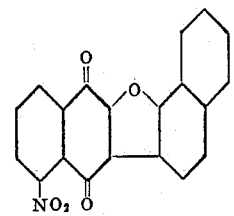

3. A compound having the formula

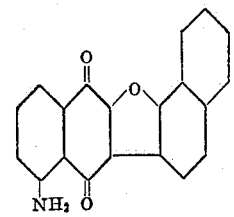

4. A compound having the formula

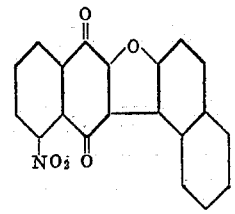

5. A compound having the formula

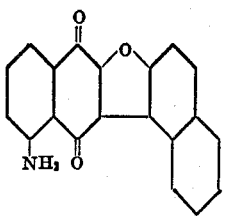

6. A compound having the formula

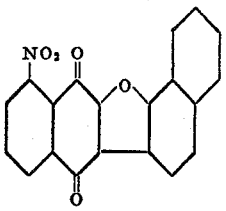

7. A compound having the formula

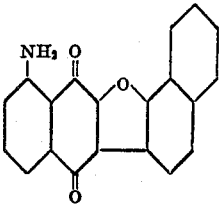

8. A compound having the formula

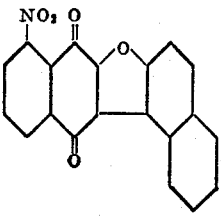

9. A compound having the formula

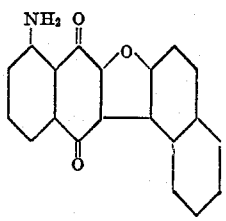

10. A process comprising reacting by heating 1 mole of 8-nitro-2,3-dichloro-1,4-naphthoquinone with 1 mole of a member of the group consisting of 1-naphthol and 2-naphthol at elevated temperatures in the presence of an alkaline acid binding agent.

11. A process as defined in claim 10 wherein said acid binding agent is pyridine.

12. A process as defined in claim 10 followed by the step of reducing the nitro groups in the resulting product to amino groups by treatment with an alkaline reducing agent.

13. A process comprising reacting by heating 1 mole of 8-nitro-2,3-dichloro-1,4-naphthoquinone with 1 mole of 1-naphthol at elevated temperatures in the presence of pyridine.

14. A process as defined in claim 13 followed by the step of reducing the nitro groups in the resulting product to amino groups by treatment with sodium hydrosulfite.

15. A process comprising reacting by heating 1 mole of 8-nitro-2,3-dichloro-1,4-naphthoquinone with 1 mole of 2-naphthol at elevated temperatures in the presence of pyridine.

16. A process as defined in claim 15 followed by the step of reducing the nitro groups in the resulting product to amino groups by treatment with sodium hydrosulfite.

17. A process of heating in the presence of pyridine, 5-nitro-2,3-dichloro-1,4-naphthoquinone with a naphthol selected from the group consisting of α-naphthol and β-naphthol and recovering the product.

18. A process as defined in claim 17 followed by the step of reducing the nitro group in the resulting product to an amino group by treatment with sodium hydrosulfite.

References Cited in the file of this patent

FOREIGN PATENTS 300,407    Great Britain _____ Nov. 15, 1928